UNITED STATES PATENT OFFICE.

EDWARD L. MARSHALL, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

1,281,409.     Specification of Letters Patent.     Patented Oct. 15, 1918.

No Drawing. Original application filed February 18, 1915, Serial No. 9,185. Divided and this application filed March 7, 1916. Serial No. 82,733.

*To all whom it may concern:*

Be it known that I, EDWARD L. MARSHALL, a citizen of the United States, residing at Fremont, in the county of Sandusky and State of Ohio, have invented a certain new and useful Improvement in Electric Batteries, of which the following is a full, clear, and exact description.

My invention relates to electric batteries, and more particularly to dry cells, and is a division of my application filed February 18, 1915, Serial No. 9,185.

Dry cells consist usually of a zinc can with a central carbon electrode and a mix packed between the two. It is necessary to keep the depolarizer in the mix from reaching the zinc can, and therefore it has been the practice to put a porous separating medium between the zinc and the mix. This medium is made of cheese cloth in some cases, and of blotting paper, pulpboard or strawboard in others.

The porous medium also acts as a reservoir for the electrolyte, but inasmuch as all such bibulous linings or separating mediums are of uneven surface, the zinc will not be in uniform contact therewith. To make the contact uniform and secure equal consumption of the zinc along its entire surface, it has been the practice to put cooked flour paste or cooked starch between the lining and the zinc. This not only fills in the uneven places in such linings, but it also acts as a diffusing body for the zinc salts formed during the action of the battery, whereby crystallization on the zinc is retarded or prevented.

I have found that the paste in a dry cell slowly diffuses through the lining and gets beyond the region where it can perform its useful function. This causes the life of the cell to be shortened, both on shelf and in service. In attempting to prevent this, I have found that if the paste is left in the raw, uncooked condition, it diffuses much more slowly through the lining, and therefore it is retained in the desired place. Consequently the use of uncooked paste causes a remarkable increase in the shelf life and service life of the cell.

Uncooked paste of flour and water is somewhat difficult to handle in applying the same to the dry cell lining, and therefore I sometimes add a small quantity of cooked paste to stiffen it and make it easier to handle. For this reason more or less of cooked paste can be added if desired.

The wet paste is next applied to a dry lining and permitted to dry. The pasted lining is next placed in the zinc can, wetted with water or electrolyte and the cell is then finished in the usual way.

While in the claims I have specified flour as the form of paste employed, this is not intended as a disclaimer of the right to equivalents.

Having described my invention, what I claim is:—

1. The method of lining a dry cell zinc can, which consists in applying wet paste to a cell lining, drying the flour paste and lining, and then placing the lining in the zinc can.

2. The method of lining a dry cell zinc can, which consists in applying wet, uncooked flour paste to a dry lining, drying the paste and lining, and then placing the lining in the zinc can.

3. The method of lining a dry cell zinc can, which consists in applying wet, uncooked flour paste to a dry lining, drying the paste and lining, placing the lining in the zinc can and wetting the dried flour and lining.

In testimony whereof I hereunto affix my signature.

EDWARD L. MARSHALL.